(12) United States Patent
Zhou et al.

(10) Patent No.: US 10,538,192 B2
(45) Date of Patent: Jan. 21, 2020

(54) EXTENSION STRUCTURE WITH EXPANDABLE SPACE

(71) Applicant: SHANGHAI HINGWAH HONEYCOMB TECHNOLOGY DEVELOPMENT CO., LTD., Shanghai (CN)

(72) Inventors: Yang Zhou, Shanghai (CN); Dong Zhou, Shanghai (CN); Weiqing Li, Shanghai (CN)

(73) Assignee: SHANGHAI HINGWAH HONEYCOMB TECHNOLOGY DEVELOPMENT CO., LTD., Shanghai (CN)

( * ) Notice: Subject to any disclaimer, the term of this patent is extended or adjusted under 35 U.S.C. 154(b) by 72 days.

(21) Appl. No.: 15/775,894

(22) PCT Filed: Dec. 23, 2016

(86) PCT No.: PCT/CN2016/111824
§ 371 (c)(1),
(2) Date: May 14, 2018

(87) PCT Pub. No.: WO2017/107994
PCT Pub. Date: Jun. 29, 2017

(65) Prior Publication Data
US 2018/0319310 A1 Nov. 8, 2018

(30) Foreign Application Priority Data

Dec. 25, 2015 (CN) .......................... 2015 1 0996588
Dec. 25, 2015 (CN) ..................... 2015 2 1104060 U
(Continued)

(51) Int. Cl.
*B60P 3/34* (2006.01)
*H04N 5/232* (2006.01)

(52) U.S. Cl.
CPC ................. *B60P 3/343* (2013.01); *B60P 3/34* (2013.01); *H04N 5/23238* (2013.01)

(58) Field of Classification Search
CPC .............................. B60P 3/34; H04N 5/23238
See application file for complete search history.

(56) References Cited

U.S. PATENT DOCUMENTS 2,122,791 A * 7/1938 Bollstrom ................. B60P 3/34
52/71
3,778,100 A * 12/1973 Dillard ...................... B60P 3/34
296/164
(Continued)

FOREIGN PATENT DOCUMENTS

| CN | 103786629 | 5/2014 |
|---|---|---|
| CN | 103818300 | 5/2014 |

(Continued)

OTHER PUBLICATIONS

PCT/CN2016/111824, International Search Report and Written Opinion dated Mach 22, 2017, 9 pages—Chinese; 3 pages—English.

*Primary Examiner* — Lori L Lyjak
(74) *Attorney, Agent, or Firm* — Andrew F. Young, Esq.; Lackenbach Siegel, LLP

(57) ABSTRACT

The invention discloses an extension structure with expandable space, comprising: a vehicle body, a lower end face of the vehicle body is provided with a plurality of hydraulic support legs; four horizontal rods, the lower side of each opening is provided with two horizontal rods; the four horizontal rods are of telescopic structures, and are folded on two sides of the vehicle body; two top plates, two bottom plates, two extension side walls, each extension side wall comprising: a first side wall plate, a second side wall plate and a third side wall plate, wherein two side edges of the first side wall plate are hinged to one side edge of the second side wall plate and one side edge of the third side wall plate, (Continued)

respectively, and the other side edge of the second side wall plate and the other side edge of the third side wall plate are hinged to two sides of the openings, respectively. By adopting the extension structure with expandable space as illustrated in the invention, space available for use can be expanded effectively, and the demand on the functions of folding and expanding the space for practical use are fully met, that is to say, extra space is not occupied in a folded state, and after being positioned, mounted and expanded, the extension structure can meet a relatively high demand for living function, and can be used repeatedly.

9 Claims, 7 Drawing Sheets

(30) Foreign Application Priority Data

Dec. 20, 2016 (CN) .......................... 2016 1 1186543
Dec. 20, 2016 (CN) ..................... 2016 2 1404070 U

(56) References Cited

U.S. PATENT DOCUMENTS

| | | | | |
|---|---|---|---|---|
| 3,866,365 A * | 2/1975 | Honigman | ............ | E04B 1/3444 52/70 |
| 4,545,171 A * | 10/1985 | Colvin | .................. | E04B 1/3442 52/71 |
| 5,154,469 A * | 10/1992 | Morrow | .................... | B60P 3/34 296/171 |
| 5,857,724 A * | 1/1999 | Jarman | ............... | B62D 33/0273 296/26.11 |
| 6,250,701 B1 * | 6/2001 | Vance | ........................ | B60P 3/32 296/172 |
| 8,407,946 B1 * | 4/2013 | Aaron | ................... | E04H 1/1266 312/258 |
| 2002/0149220 A1 * | 10/2002 | Wishart | .................... | B60P 3/34 296/26.15 |
| 2002/0171255 A1 * | 11/2002 | Eichhorn | .................. | B60P 3/34 296/26.01 |
| 2008/0142059 A1 * | 6/2008 | Bonebrake | ................ | B60P 3/34 135/88.1 |

FOREIGN PATENT DOCUMENTS

| | | | | |
|---|---|---|---|---|
| CN | 103935284 | | 7/2014 | |
| CN | 203713667 | | 7/2014 | |
| CN | 203727253 | | 7/2014 | |
| CN | 105438052 | | 3/2016 | |
| CN | 205273269 | | 6/2016 | |
| EP | 1582639 A2 | * | 10/2005 | ............... B60P 3/34 |
| KR | 20120122662 A | * | 11/2012 | |
| KR | 101420377 B1 | * | 7/2014 | |
| WO | WO2011034349 | | 8/2011 | |
| WO | WO-2015079272 A1 | * | 6/2015 | |

* cited by examiner

EXTENSION STRUCTURE WITH EXPANDABLE SPACE

CROSS REFERENCE TO PRIORITY CLAIM

This application is a § 371 national phase of Ser. No. PCT/CN2016/111824 filed Dec. 23, 2016, the entire contents of which is incorporated herein by reference, and which claims priority from CN 201510996588.5 filed Dec. 25, 2015; CN 201521104060.4 filed Dec. 25, 2015; CN 201611186543.2 filed Dec. 20, 2016; and CN 201621404070.4 filed Dec. 20, 2016.

1. FIELD OF THE INVENTION

The invention relates to the technical field of extension structure, and more particularly, to an extension structure with expandable space.

2. DESCRIPTION OF THE RELATED ART

Living space is determined by the volume surrounded by a standing plane. Since the standing plane is immovable, the use of living space is limited, and thus, people's need for a larger and more comfortable living space cannot be fully met.

SUMMARY OF THE INVENTION

In view of the problems discussed above, one object of the present invention is to provide an extension structure with expandable space.

In order to achieve the above purpose, the technical solutions adopted herein are as follows:

an extension structure with expandable space, comprising: a vehicle body, each of two sides of the vehicle body being provided with an opening, and a lower end face of the vehicle body being provided with a plurality of hydraulic support legs; two top plates, each of the top plates being hinged to an upper edge of one of the openings and being a foldable structure; two bottom plates, each of the bottom plates being hinged to a lower edge of one of the openings and being a foldable structure; two extension side walls, each of the extension side walls comprising: a first side wall plate, a second side wall plate and a third side wall plate, wherein two side edges of the first side wall plate are hinged to one side edge of the second side wall plate and one side edge of the third side wall plate, respectively, and the other side edge of the second side wall plate and the other side edge of the third side wall plate are hinged to two sides of the openings, respectively; and a vehicle body parking horizontal control system, for controlling the unfolding and folding of the top plates, the bottom plates and the extension side walls, and also, for controlling the four hydraulic support legs.

The extension structure with expandable space, wherein a single-sided fin plate is arranged on each of two sides of a roof of the vehicle body, and a guiding gutter is arranged on a lower part of each of the single-sided fin plates, each of the guiding gutters is communicated with the area below a chassis of the vehicle body.

The extension structure with expandable space, further comprises four horizontal rods, wherein a lower side of each of the openings is provided with two horizontal rods; the four horizontal rods are of telescopic structures, and can be folded on two sides of the vehicle body; and the four horizontal rods are on the same plane when unfolded, each bottom plate lays on the two horizontal rods when unfolded.

The extension structure with expandable space, wherein the lower side of the bottom plate is provided with a height-adjustable support when the bottom plate is in an unfolded state, and said support is an electric support or a manual support or a hydraulic support.

The extension structure with expandable space, wherein both the second side wall plate and the third side wall plate can be folded axially along at least one vertical direction, and the top plates and the bottom plates are folded axially along at least one horizontal direction.

The extension structure with expandable space, wherein the top plates, the bottom plates and the extension side walls are respectively unfolded or folded by a hydraulic oil cylinder, or an electric wire rod or a chain, or a wire rope, or a group of gear and rack transmission mechanism.

The extension structure with expandable space, wherein, each of the top plates comprises an awning or a thin-film solar cell panel.

The extension structure with expandable space, wherein an infrared detection system is disposed in the vehicle body, and an infrared probe in the infrared detection system is disposed in one of the top plates, or one of the bottom plates, or one of the extension side walls.

The extension structure with expandable space, wherein, a panorama video monitoring system is arranged in the vehicle body, and a monitoring probe of the panorama video monitoring system is disposed in one of the top plates, or one of the bottom plates, or one of the extension side walls.

The extension structure with expandable space, wherein the vehicle body comprises a plurality of inflatable walls for partitioning space.

When compared with the prior art, the present invention has the following beneficial effects by adopting the above technical solutions:

by adopting the extension structure with expandable space as illustrated in the invention, space available for use can be expanded effectively, and the demand on the functions of folding and expanding the space for practical use are fully met, that is to say, extra space is not occupied in a folded state, and after being positioned, mounted and expanded, the extension structure can meet a relatively high demand for living function, and can be used repeatedly.

BRIEF DESCRIPTION OF THE DRAWINGS

The accompanying drawings, together with the specification, illustrate exemplary embodiments of the present disclosure, and, together with the description, serve to explain the principles of the present invention.

Figure 1:
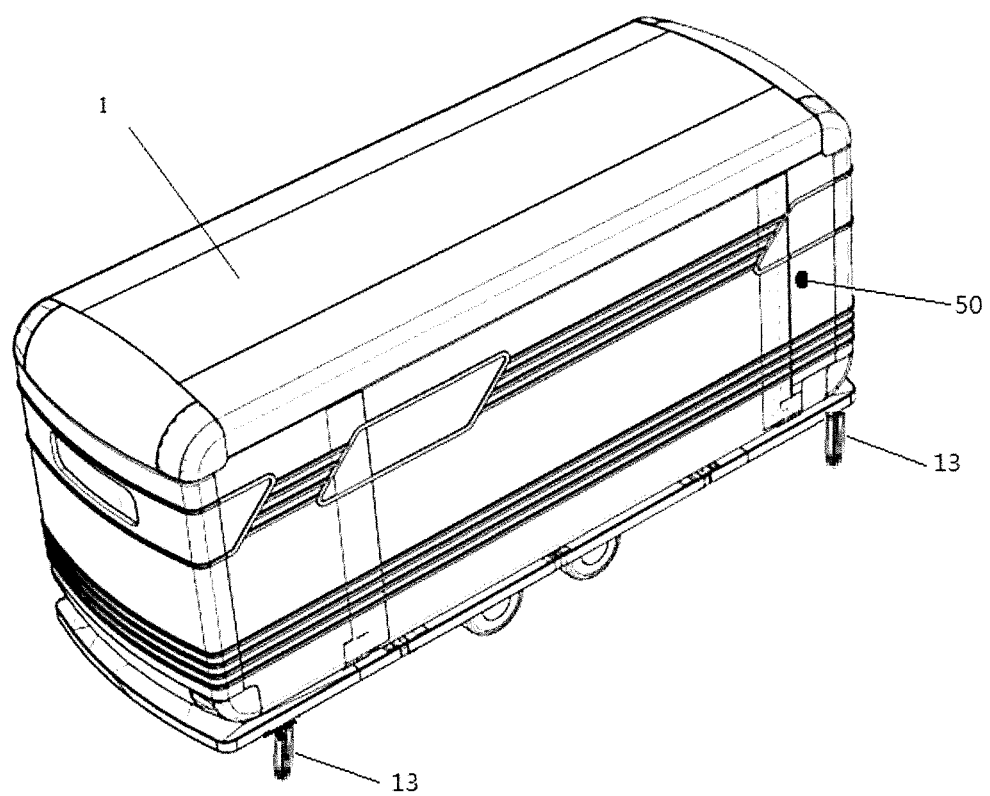
FIG. 1 is an overall view of an extension structure with expandable space according to the present invention.

In the drawings: 1 vehicle body; 11 horizontal rod; 12 single-sided fin plate; 13 hydraulic support leg; 14 guiding gutters; 15 infrared detection system; 16 infrared probe; 17 panorama video monitoring system; 18 monitoring probe; 2 top plate; 21 awning or thin-film solar cell panel; 22 upper edge; 23 lower edge; 3 bottom plate; 31 support; 41 first side wall plate; 42 second side wall plate; 43 third side wall plate; 5 terrace door; 50 vehicle body parking horizontal control system

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the term "plurality" means a number greater than one.

Hereinafter, certain exemplary embodiments according to the present disclosure will be described with reference to the accompanying drawings.

Figure 2:
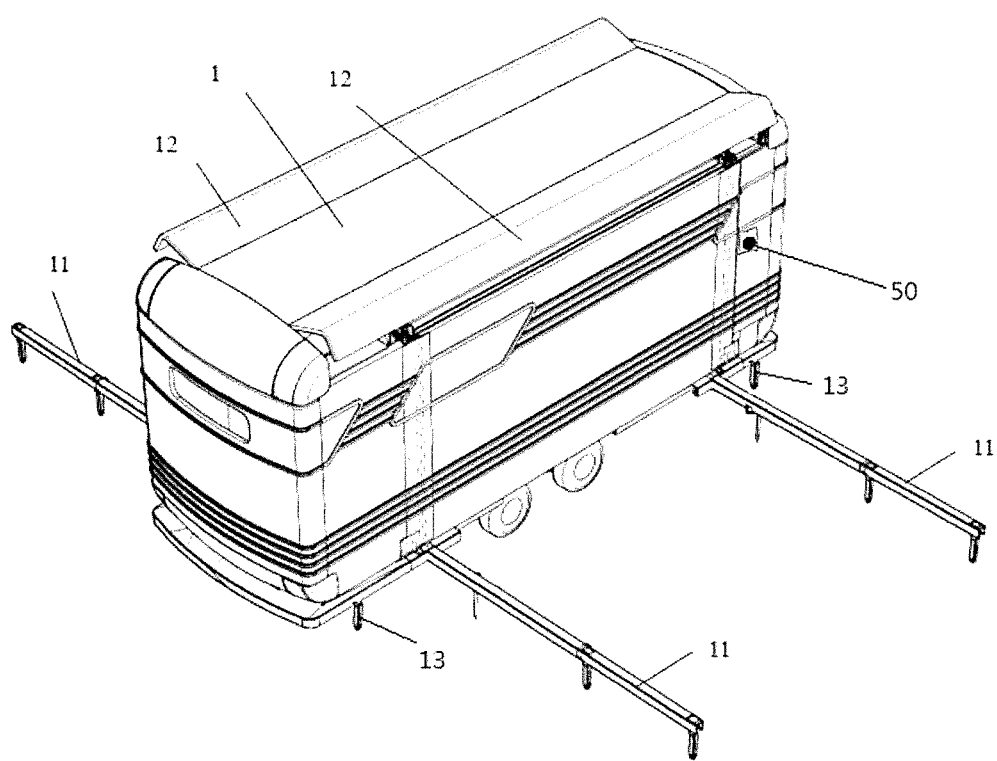
FIG. 2 is a partially expanded view of an extension structure with expandable space according to the present invention.

FIG. 1 is a schematic view of an extension structure with expandable space according to the present invention; FIG. 2 is a partially expanded view of an extension structure with expandable space according to the present invention. FIGS. 1 and 2 show an extension structure with expandable space of a preferred embodiment, comprising: a vehicle body 1, two top plates 2 and two bottom plates 3, wherein each of the two sides of the vehicle body 1 is provided with an opening, and a lower end face of the vehicle body 1 is provided with a plurality of hydraulic support legs 13. Each of the top plates 2 is hinged to an upper edge 22 of one of the openings and is a foldable structure. Each of the bottom plates 3 is hinged to a lower edge 23 of one of the openings and is a foldable structure.

Moreover, in a preferred embodiment, the extension structure with expandable space further comprises a support structure for supporting the two bottom plates 3.

Figure 3:
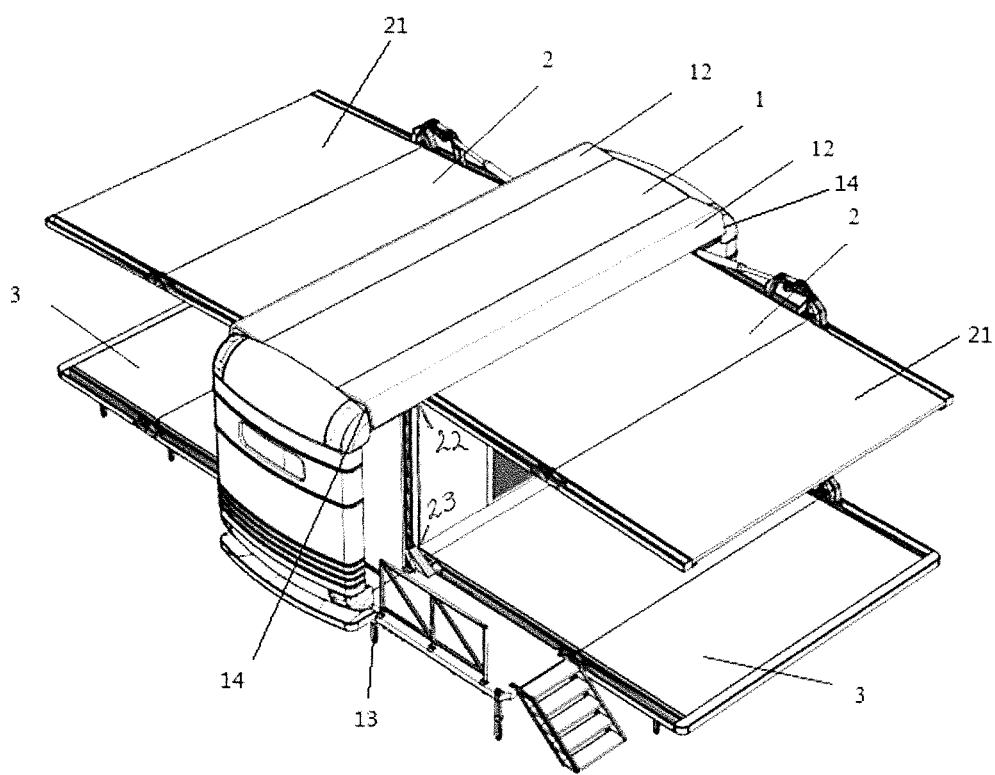
FIG. 3 is a further expanded view of an extension structure with expandable space according to the present invention.

FIG. 3 is a further expanded view of an extension structure with expandable space according to the present invention, which shows a support structure of the two bottom plates 3, comprising: four horizontal rods 11, a lower side of each of the openings is provided with two horizontal rods 11; the four horizontal rods 11 are of telescopic structures, and are folded on two sides of the vehicle body. Moreover, a plurality of foldable hydraulic support legs 13 are also provided below the four horizontal rods 11. The support point in the horizontal rod being as the same height as the joint point of the unfolded area is realized by means of manual adjustment. The four horizontal rods 11 function as bumpers when folded. Each of the bottom plates 3 lays on the two horizontal rods 11 when unfolded.

Figure 6:
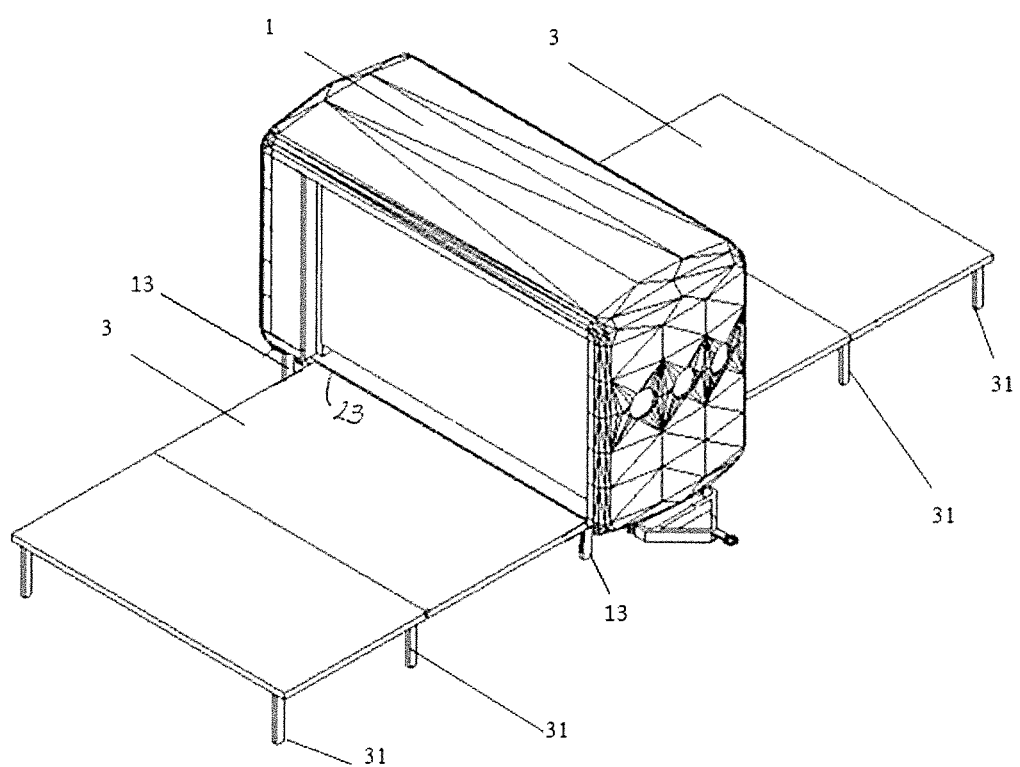
FIG. 6 is a second expanded view of an extension structure with expandable space according to the present invention.
Figure 7:
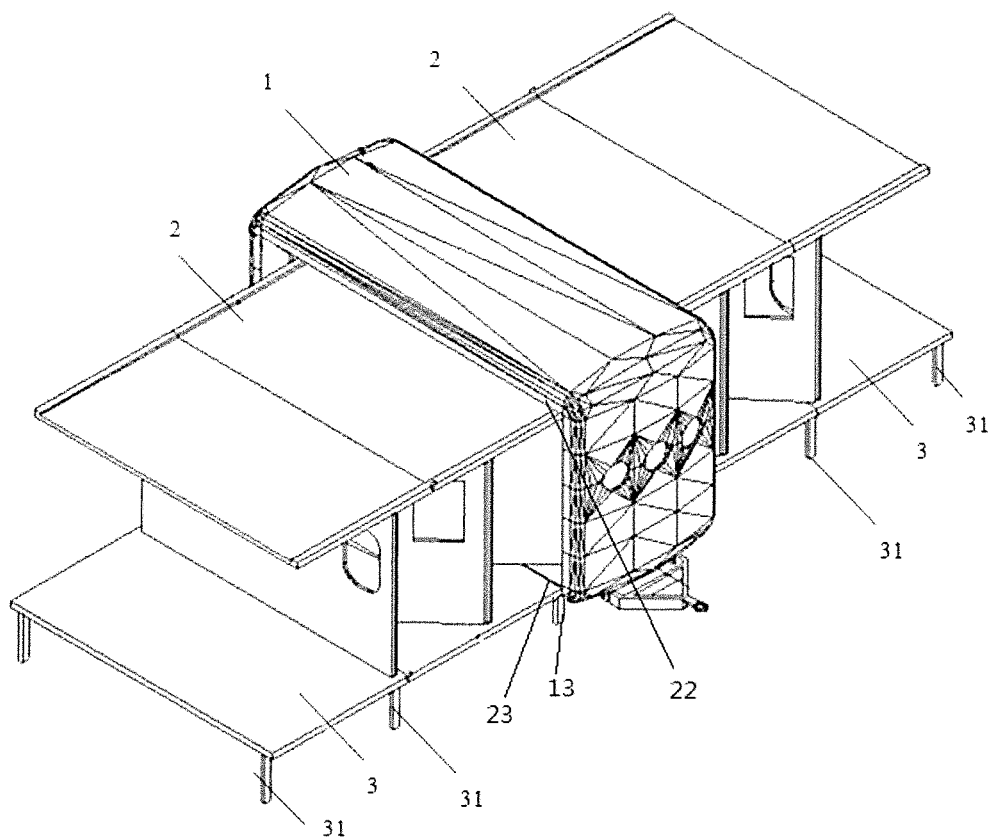
FIG. 7 is a further second expanded view of an extension structure with expandable space according to the present invention.

FIG. 6 is a second expanded view of an extension structure with expandable space according to the present invention; FIG. 7 is a further second expanded view of an extension structure with expandable space according to the present invention. FIGS. 6 and 7 show another support structure for the two bottom plates 3, comprising: a support 31, and the lower side of the bottom plate 3 is provided with a height-adjustable support 31 when the bottom plate is in an unfolded state, and said support 31 is an electric support, or a manual support, or a hydraulic support.

Figure 4:
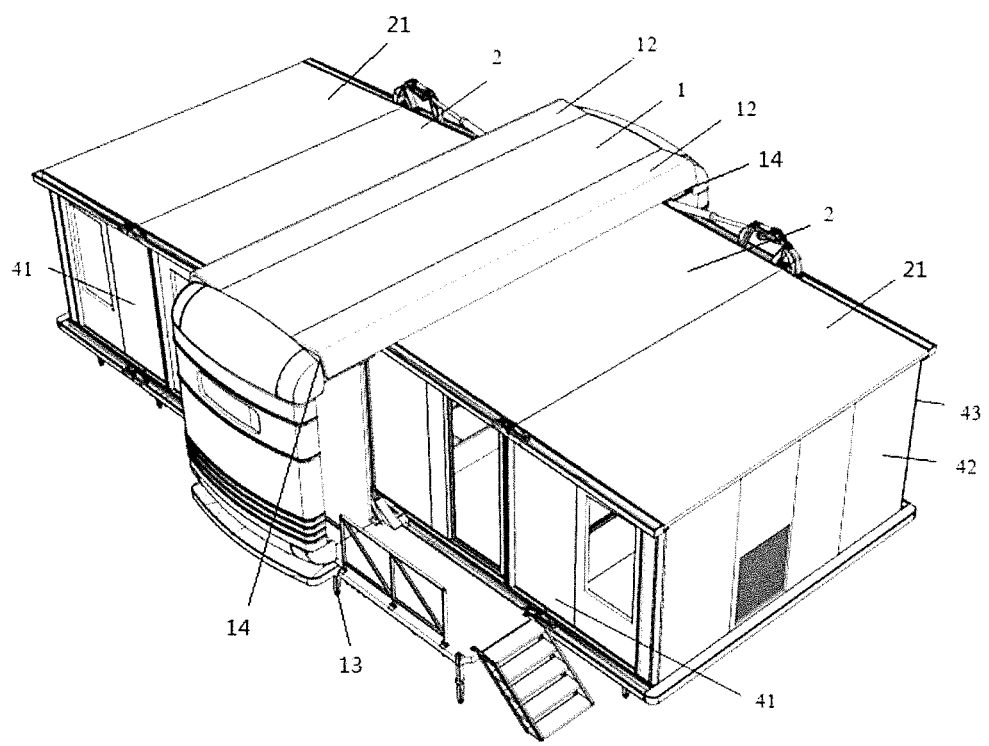
FIG. 4 is a fully expanded view of an extension structure with expandable space according to the present invention.

FIG. 4 is a fully expanded view of an extension structure with expandable space according to the present invention.

Further, in a preferred embodiment, the extension structure with expandable space further comprises two extension side walls, each of the extension side walls comprising: a first side wall plate 41, a second side wall plate 42 and a third side wall plate 43, wherein two side edges of the first side wall plate 41 are hinged to one side edge of the second side wall plate 42 and one side edge of the third side wall plate 43, respectively, and the other side edge of the second side wall plate 42 and the other side edge of the third side wall plate 43 are hinged to two sides of the openings, respectively. When the extension structure with expandable is in use, the top plates, the bottom plates and the extension side walls are unfolded, so as to increase the living space; when the extension structure with expandable is not in use, the top plates, the bottom plates and the extension side walls can be folded and concealed within the standing plane without occupying extra space. Wherein, a hinge joint can be adopted as the hinge, and the hinge joint meets the requirements that the torque thereof is not less than 200 kg-m, and the angle thereof is in the range of 0-180 degrees.

In addition, in a preferred embodiment, the extension structure with expandable space further comprises a vehicle body parking horizontal control system 50, for controlling the unfolding and folding of the top plates 2, the bottom plates 3 and the extension side walls, and also, for controlling the four hydraulic support legs 13. By using the vehicle body parking horizontal control system 50, length of the hydraulic support legs can be automatically adjusted, thus achieving the support on the floor and the horizontal status of the vehicle body.

Further, in a preferred embodiment, a single-sided fin plate 12 is arranged on two sides of a roof of the vehicle body 1, and a guiding gutter 14 is arranged on a lower part of each of the single-sided fin plates 12, each of the guiding gutters 14 is communicated with the area below a chassis of the vehicle body 1, so as to address the need of guiding rainwater in the roof. After the single-sided fin plate 12 is unfolded electrically, the bottom plates 3 and the top plates 2 are unfolded. After the top plates 2 are fully unfolded and are kept in position, the fin plate 12 is lowered to a specific position, so as to shelter from the rain.

Further, in a preferred embodiment, both the second side wall plate 42 and the third side wall plate 43 are folded axially along at least one vertical direction, such that the second side wall plate 42 and the third side wall plate 43 can be folded axially along the vertical direction to be integral with the vehicle body 1.

Further, in a preferred embodiment, the top plates 2 and the bottom plates 3 can be folded axially along at least one horizontal direction, such that the top plates 2 and the bottom plates 3 can be folded axially along the horizontal direction to be integral with the vehicle body 1.

The foregoing are only the preferred embodiments of the invention, not thus limiting embodiments and scope of the invention.

The present invention also has the following embodiments based on the above embodiments:

In a further embodiment of the present invention, referring to FIG. 4, the top plates 2, the bottom plates 3 and the extension side walls are respectively unfolded or folded by a hydraulic oil cylinder, or a electric wire rod, or a chain, or a wire rope, or a group of gear and rack transmission mechanism.

In a further embodiment of the present invention, each of the top plates 2 comprises an awning or a thin-film solar cell panel 21.

In a further embodiment of the present invention, an infrared detection system 15 is disposed in the vehicle body 1 and an infrared probe 16 in the infrared detection system 15 is disposed in one of the top plates 2, or one of the bottom plates 3, or one of the extension side walls. The infrared detection system 15 is used for keeping a safe living environment. Moreover, video system signal can be transmitted to the tractor cab in real time. A driver can see the surrounding environment around a trailer during driving.

In a further embodiment of the present invention, a panorama video monitoring system 17 is arranged in the vehicle body 1, and a monitoring probe 18 of the panorama video monitoring system 17 is disposed in one of the top plates 2, or one of the bottom plates 3, or one of the extension side walls.

In a further embodiment of the present invention, the vehicle body 1 comprises a plurality of inflatable walls for partitioning space. Said inflatable walls are used for partitioning the space in the vehicle body 1, and also for being unfolded to a minimum thickness.

Figure 5:
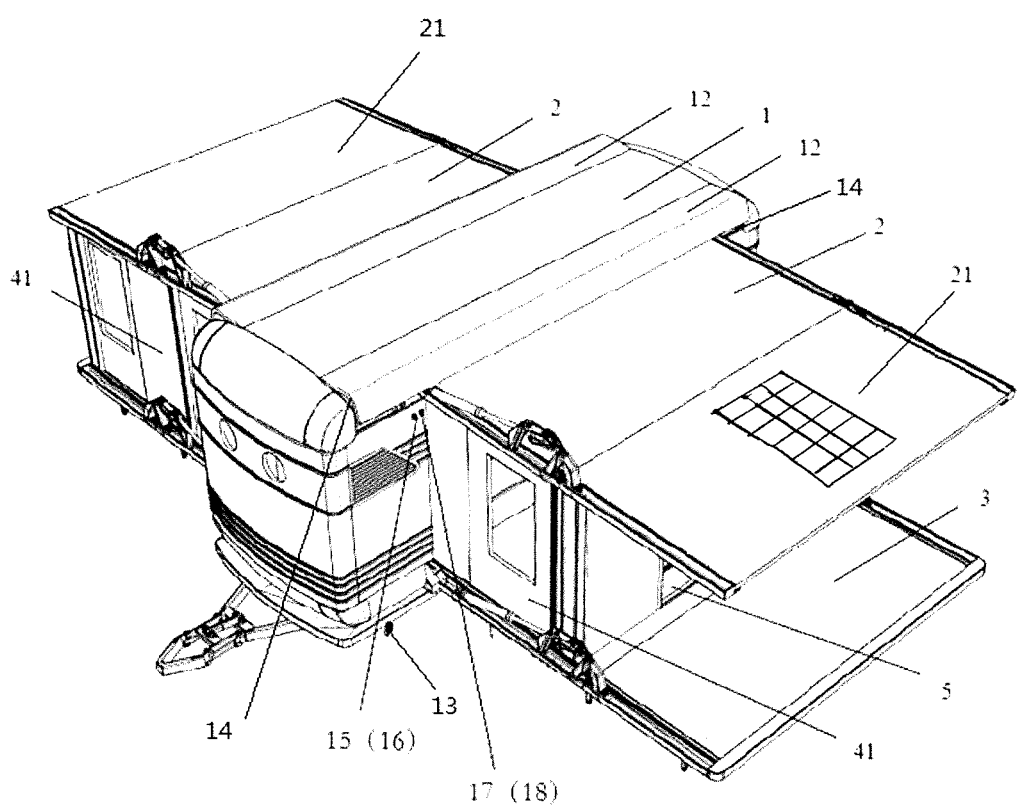
FIG. 5 is an expanded view of a terrace of an extension structure with expandable space according to the present invention.

FIG. 5 is an expanded view of a terrace of an extension structure with expandable space according to the present invention.

In a further embodiment of the present invention, a terrace door 5 is opened in the bedroom end cabinet on the side of an entrance door, and when the terrace is needed to be used, the bedroom on this side is folded to form a terrace having a roof covered outside, such that people's need for different space can be met.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. An extension structure with expandable space, comprising:
   a vehicle body, each of two sides of the vehicle body being provided with an opening, and a lower end face of the vehicle body being provided with a plurality of hydraulic support legs;
   two top plates, each of the top plates being hinged to an upper edge of one of the openings and being a foldable structure;
   two bottom plates, each of the bottom plates being hinged to a lower edge of one of the openings and being a foldable structure;
   two extension side walls, each of the extension side walls comprising: a first side wall plate, a second side wall plate and a third side wall plate, wherein two side edges of the first side wall plate are hinged to one side edge of the second side wall plate and one side edge of the third side wall plate, respectively, and the other side edge of the second side wall plate and the other side edge of the third side wall plate are hinged to two sides of the openings, respectively; and
   a vehicle body parking horizontal control system, for controlling the unfolding and folding of the top plates, the bottom plates and the extension side walls, and also, for controlling the four hydraulic support legs.

2. The extension structure with expandable space of claim 1, wherein a single-sided fin plate is arranged on each of two sides of a roof of the vehicle body, and a guiding gutter is arranged on a lower part of each of the single-sided fin plates, each of the guiding gutters is communicated with the area below a chassis of the vehicle body.

3. The extension structure with expandable space of claim 1, further comprises four horizontal rods, wherein a lower side of each of the openings is provided with two horizontal rods; the four horizontal rods are of telescopic structures, and are folded on two sides of the vehicle body; and the four horizontal rods are on the same plane when unfolded, each bottom plate lays on the two horizontal rods when unfolded.

4. The extension structure with expandable space of claim 1, wherein the lower side of the bottom plate is provided with a height-adjustable support when the bottom plate is in an unfolded state, and said support is an electric support or a manual support or a hydraulic support.

5. The extension structure with expandable space of claim 1, wherein both the second side wall plate and the third side wall plate are folded axially along at least one vertical direction, and the top plates and the bottom plates are folded axially along at least one horizontal direction.

6. The extension structure with expandable space of claim 1, wherein the top plates, the bottom plates and the extension side walls are respectively unfolded or folded by a hydraulic oil cylinder, or an electric wire rod, or a chain, or a wire rope, or a group of gear and rack transmission mechanism.

7. The extension structure with expandable space of claim 1, wherein each of the top plate comprises an awning or a thin-film solar cell panel.

8. The extension structure with expandable space of claim 1, wherein an infrared detection system is disposed in the vehicle body, and an infrared probe in the infrared detection system is disposed in one of the top plates, or one of the bottom plates, or one of the extension side walls.

9. The extension structure with expandable space of claim 1, wherein a panorama video monitoring system is arranged in the vehicle body, and a monitoring probe of the panorama video monitoring system is disposed in one of the top plates, or one of the bottom plates, or one of the extension side walls.

* * * * *